US009262517B2

(12) United States Patent
Feng et al.

(10) Patent No.: US 9,262,517 B2
(45) Date of Patent: Feb. 16, 2016

(54) SYSTEMS AND METHODS FOR SOCIAL MEDIA DATA MINING

(75) Inventors: Junlan Feng, Basking Ridge, NJ (US);
Luciano de Andrade Barbosa,
Madison, NJ (US); Valerie Torres,
Summit, NJ (US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 443 days.

(21) Appl. No.: 12/858,852

(22) Filed: Aug. 18, 2010

(65) Prior Publication Data

US 2012/0047219 A1 Feb. 23, 2012

(51) Int. Cl.
*G06F 15/16* (2006.01)
*G06F 17/30* (2006.01)
*G06Q 30/02* (2012.01)
*G06Q 50/00* (2012.01)

(52) U.S. Cl.
CPC ...... *G06F 17/3071* (2013.01); *G06F 17/30864* (2013.01); *G06Q 30/02* (2013.01); *G06Q 50/01* (2013.01)

(58) Field of Classification Search
USPC ......... 709/200, 204, 205, 206, 207, 217, 224, 709/244; 707/769, E17.108, 705, 706, 722, 707/723, 728, 729, 730, 741, 754, 758, 781, 707/999.001–999.01, 5, E17.022, 661, 707/E17.005, 628, 748, E17.044
See application file for complete search history.

(56) References Cited

U.S. PATENT DOCUMENTS

| 7,185,065 | B1 * | 2/2007 | Holtzman et al. | 709/217 |
|---|---|---|---|---|
| 7,421,660 | B2 * | 9/2008 | Charnock et al. | 715/751 |
| 7,600,017 | B2 * | 10/2009 | Holtzman et al. | 709/224 |
| 7,818,394 | B1 * | 10/2010 | Lawler et al. | 709/217 |
| 7,831,684 | B1 * | 11/2010 | Lawler et al. | 709/217 |
| 7,844,671 | B1 * | 11/2010 | Lawler et al. | 709/206 |
| 7,958,109 | B2 * | 6/2011 | Lin et al. | 707/706 |
| 7,974,983 | B2 * | 7/2011 | Goeldi | 707/769 |
| 8,010,545 | B2 * | 8/2011 | Stefik et al. | 707/758 |
| 8,010,619 | B1 * | 8/2011 | Lawler et al. | 709/217 |
| 8,073,850 | B1 * | 12/2011 | Hubbard et al. | 707/736 |
| 8,271,429 | B2 * | 9/2012 | Ghuneim et al. | 707/602 |
| 2002/0062368 | A1 * | 5/2002 | Holtzman et al. | 709/224 |
| 2008/0071796 | A1 * | 3/2008 | Ghuneim et al. | 707/10 |
| 2008/0091656 | A1 * | 4/2008 | Charnock et al. | 707/3 |
| 2008/0215607 | A1 * | 9/2008 | Kaushansky et al. | 707/102 |
| 2009/0164417 | A1 * | 6/2009 | Nigam et al. | 707/2 |
| 2009/0319518 | A1 * | 12/2009 | Koudas et al. | 707/5 |
| 2010/0057577 | A1 * | 3/2010 | Stefik et al. | 705/14.73 |
| 2010/0119053 | A1 * | 5/2010 | Goeldi | 379/265.09 |
| 2010/0121707 | A1 * | 5/2010 | Goeldi | 705/14.49 |
| 2010/0121843 | A1 * | 5/2010 | Goeldi | 707/722 |
| 2010/0121849 | A1 * | 5/2010 | Goeldi | 707/736 |
| 2010/0141655 | A1 * | 6/2010 | Belinsky et al. | 345/440 |

(Continued)

*Primary Examiner* — Saket K Daftuar
(74) *Attorney, Agent, or Firm* — Hartman & Citrin LLC

(57) ABSTRACT

Systems and methods are provided to collect, analyze and report social media aggregated from a plurality of social media websites. Social media is retrieved from social media websites, analyzed for sentiment, and categorized by topic and user demographics. The data is then archived in a data warehouse and various interfaces are provided to query and generate reports on the archived data. In some embodiments, the system further recognizes alert conditions and sends alerts to interested users. In some embodiments, the system further recognizes situations where users can be influenced to view a company or its products in a more favorable light, and automatically posts responsive social media to one or more social media websites.

17 Claims, 8 Drawing Sheets

(56) References Cited

U.S. PATENT DOCUMENTS

| | | | |
|---|---|---|---|
| 2010/0257117 A1* | 10/2010 | Shvadron et al. | 705/36 R |
| 2010/0275128 A1* | 10/2010 | Ward et al. | 715/744 |
| 2010/0299326 A1* | 11/2010 | Germaise | 707/728 |
| 2010/0306249 A1* | 12/2010 | Hill et al. | 707/769 |
| 2010/0325127 A1* | 12/2010 | Chaudhuri et al. | 707/759 |
| 2011/0004483 A1* | 1/2011 | Ting et al. | 705/1.1 |
| 2011/0055007 A1* | 3/2011 | Kitagawa et al. | 705/14.49 |
| 2011/0055196 A1* | 3/2011 | Sundelin et al. | 707/711 |
| 2011/0179020 A1* | 7/2011 | Ozzie et al. | 707/723 |
| 2011/0196677 A1* | 8/2011 | Deshmukh et al. | 704/246 |
| 2012/0005224 A1* | 1/2012 | Ahrens et al. | 707/769 |
| 2012/0047534 A1* | 2/2012 | Gharachorloo et al. | 725/53 |

\* cited by examiner

FIG. 5

SYSTEMS AND METHODS FOR SOCIAL MEDIA DATA MINING

FIELD OF THE TECHNOLOGY

At least some embodiments disclosed herein relate, in general, to systems that collect information available over the Internet, and more particularly, to collecting data from social networking sites and providing tools to query and analyze such information.

BACKGROUND

Websites that allow users to interact with one another have exploded in popularity in the last few years. Social networking websites such as Facebook and LinkedIn, and microblogging websites such as Twitter enjoy widespread use. Millions of users post messages, images and videos on such websites on a daily, even hourly basis, oftentimes reporting events on a real-time or near-time basis, and revealing the user's activities and interests. Users typically direct messages to specific persons, their social group, or perhaps businesses maintaining a presence on social networking websites; however, oftentimes such messages are visible to the general public.

Such publicly accessible social media represents a potentially rich mine of information that can provide insight into user's lives and events across the country and across the world. Such information could be of great interest to various types of business organizations. For example, a network provider may wish to track all messages describing network problems across the country on a real-time basis. In another example, a national hotel chain may wish to track all messages relating to its hotel services, and in particular, messages reporting problems experienced by hotel guests. The sheer volume of such information, however, and the velocity of its flow, presents formidable difficulties for persons or organizations that wish to track and analyze such information.

BRIEF DESCRIPTION OF THE DRAWINGS

The embodiments are illustrated by way of example and not limitation in the figures of the accompanying drawings in which like references indicate similar elements.

FIG. 5 illustrates an interface that displays a real-time stream of the most recent social media posts relating to the topic "XYZ."

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference in this specification to "social media" should be understood to refer to any type of electronically-stored information that users send or make available to other users for the purpose of interacting with other users in a social context. Such media can include directed messages, status messages, broadcast messages, audio files, image files and video files. Reference in this specification to "social media websites" should be understood to refer to any website that facilitates the exchange of social media between users. Examples of such websites include social networking websites such as Facebook and LinkedIn and microblogging websites such as Twitter.

Figure 1:
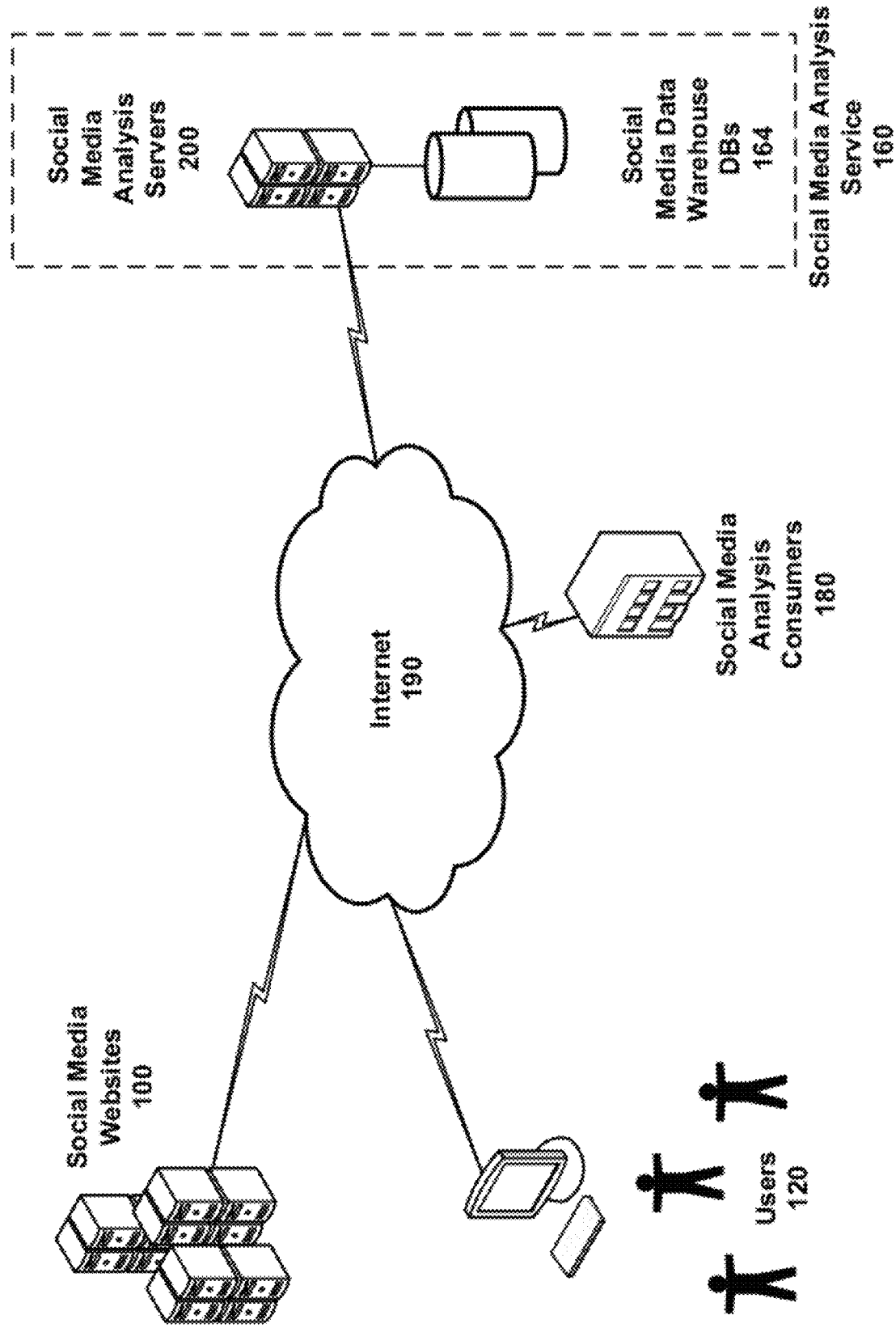
FIG. 1 illustrates a high-level view of a social media analysis service in the context of a network of users and social media sources.

Various embodiments of the systems and methods disclosed herein collect and enrich social media gathered from a plurality of social media websites and provide various interfaces and reporting functions to allow end users to track topics within such enriched social media. FIG. 1 illustrates a high-level view of a social media analysis service in the context of a network of users and social media sources. A plurality of users 120 interact with one another via a plurality of social media websites 100 such as, for example, social networking and microblogging websites.

A social media analysis service 160 hosts one or more social media analysis servers 200 that collect social media from social media websites 100 and enrich and store such social media in one or more social media data warehouse databases 164. The social media analysis servers 200 provide one or more user interfaces that allow social media analysis consumers 180 to view and analyze aggregated social media stored on the social media data warehouse databases 164. Such consumers could include any type of business that has an interest in the content of social media. In one embodiment, the social media analysis service 160 and the social media analysis consumers 180 could be within a single organization. In one embodiment, the social media analysis service 160 and the social media analysis consumers 180 could be separate entities.

Figure 2:
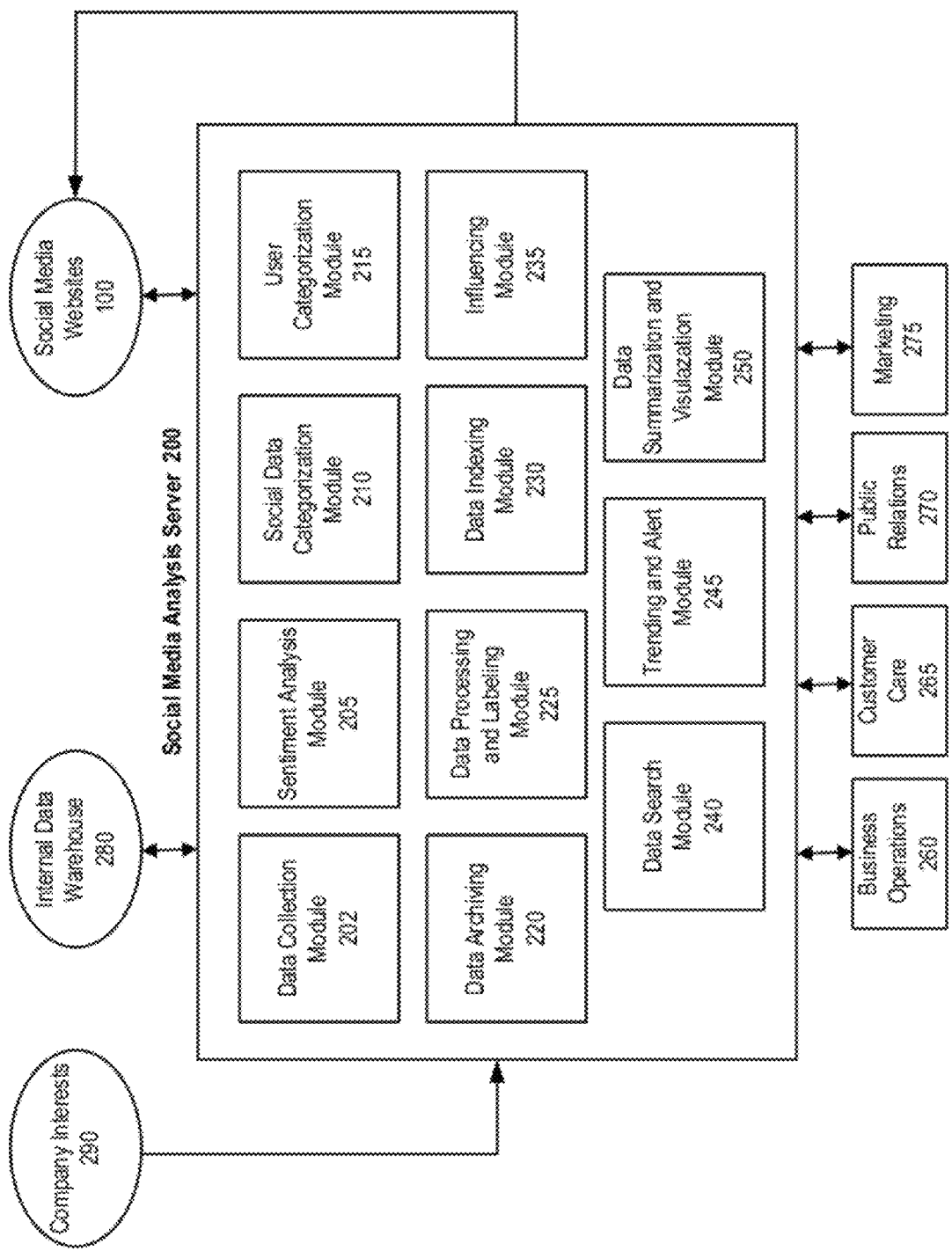
FIG. 2 illustrates a more detailed view of a social media analysis server.

FIG. 2 illustrates a more detailed view of a social media analysis server 200. In the illustrated embodiment, social media analysis server 200 collects social media from various social media websites 100, stores the collected media in an internal data warehouse 280 and provides access to the warehoused social media to various business units within a business. Such business units could include business operations 260, customer care 265, public relations 270 and marketing 275.

The social media analysis server 200 comprises a number of modules that provide various functions related to social media collection analysis. In one embodiment, the social media analysis server 200 includes a data collection module 202 that collects social media from social media websites 100. In one embodiment, the data collection module 202 collects social media that relates to company interests 290, such as, for example, posts that reference the company by name, posts that relate to specific topics, and/or posts that relate to specific users.

In one embodiment, the social media analysis server 200 includes a sentiment analysis module 205 that attempts to determine the nature of the sentiments, such as tone and mood, expressed by users in social media posts. In one embodiment, the social media analysis server 200 includes a social data categorization module 210 that categorizes social media postings by, for example, topic, company, mood or tone. In one embodiment, the social media analysis server 200 includes user categorization module 215 that categorizes users, for example, by various demographic characteristics or usage patterns. In one embodiment, the social media analysis server 200 includes a data archiving module 220 that archives collected social media in the internal data warehouse 280 in association with user profiles and user social connections of users relating to the social media. In one embodiment, the social media analysis server 200 includes a data processing and labeling module 225 that labels social media data with various tags, such as categories determined by the social data categorization module 210 and the user categorization module 215. In one embodiment, the social media analysis server 200 includes a data indexing module 230 that indexes archived social media by one or more properties. Such properties could include, for example, key words, user sentiments, or user demographics. In one embodiment, the social media analysis server 200 includes an influencing module 235 that posts data to social media websites in response to the occurrence of influencing conditions in archived social media to influence users of such social media websites.

In one embodiment, the social media analysis server 200 includes a data search module 240 that provides facilities allowing users to search archived social media using search criteria such as, for example, one or more keywords or key phrases. In one embodiment, the server includes a trending and alert module 245 that identifies conditions in social media that users have selected for alerts, for example, degradation in network performance.

In one embodiment, the social media analysis server 200 includes a data visualization and summarization module 250 that allows social data analysis consumers to query social media archived in the internal data warehouse 280. In one embodiment, the data visualization and summarization module 250 uses the aggregated social media, along with associated archived user profile information and user social connections to support high-level business intelligence through data mining. In one embodiment, data visualization and summarization functions provide facilities to visualize the trend of the archived posts and categorized topics, social media trends with internal business data and correlated posts from similar topics for intelligence mining. In one embodiment, the output of data mining and analysis is stored on a database and indexed by the data archiving module 220 along with archived posts, user profiles, and user social connection to support expanded search capabilities. In one embodiment, the visualization and summarization module 250 provides various views into the aggregated social media, as shown in FIG. 3-6 below. Such visualized information can be used to guide to business operations 260, customer care 265, public relations 270 and marketing 275, to engage in social media conversation for better communications with customers and consumers.

Figure 3:
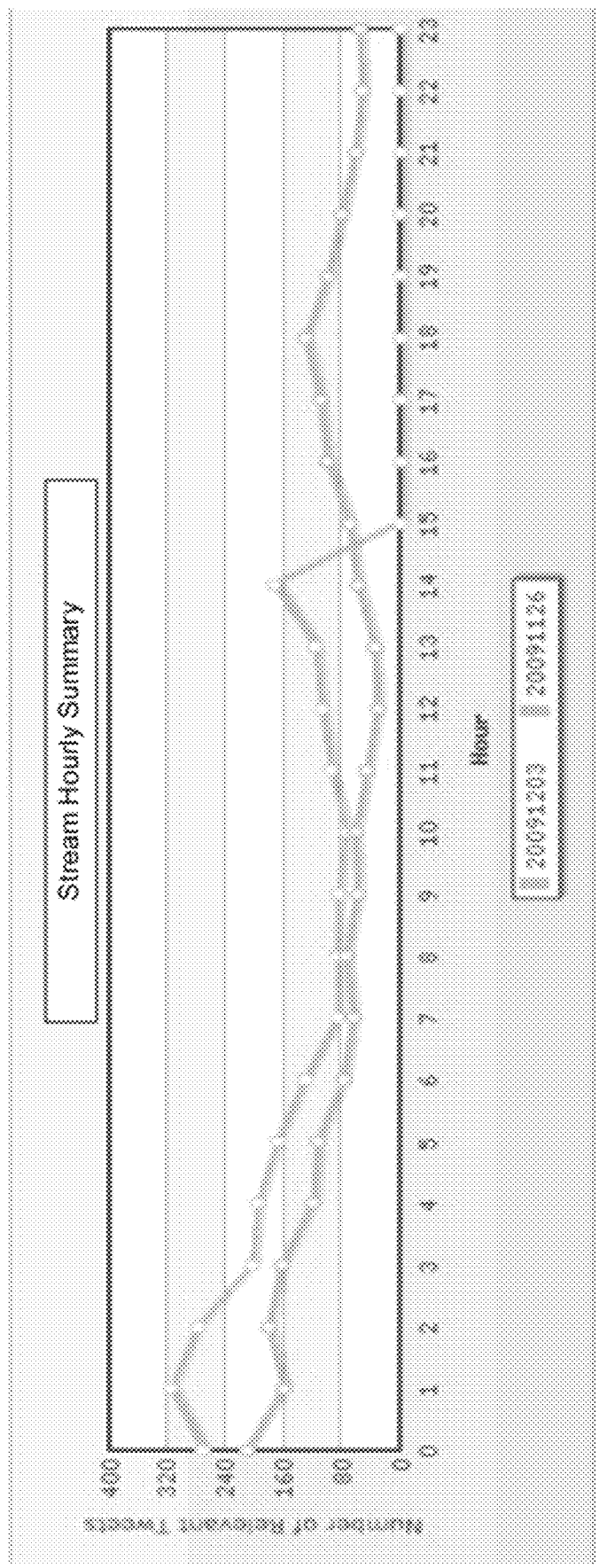
FIG. 3 illustrates an interface that displays a simple count of social media posts (e.g. tweets on Twitter) relating to a topic "XYZ."
Figure 4:
FIG. 4 illustrates an interface that displays a cloud of the most common phrases associated with the topic "XYZ" in the past hour.
Figure 5:
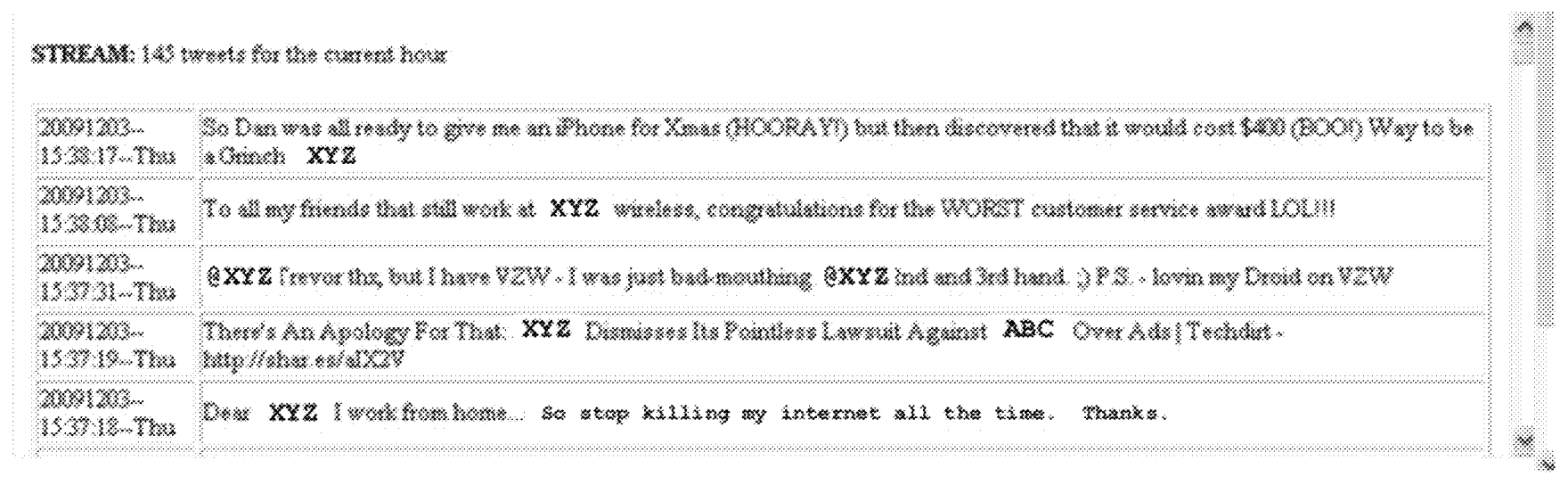
Figure 6:
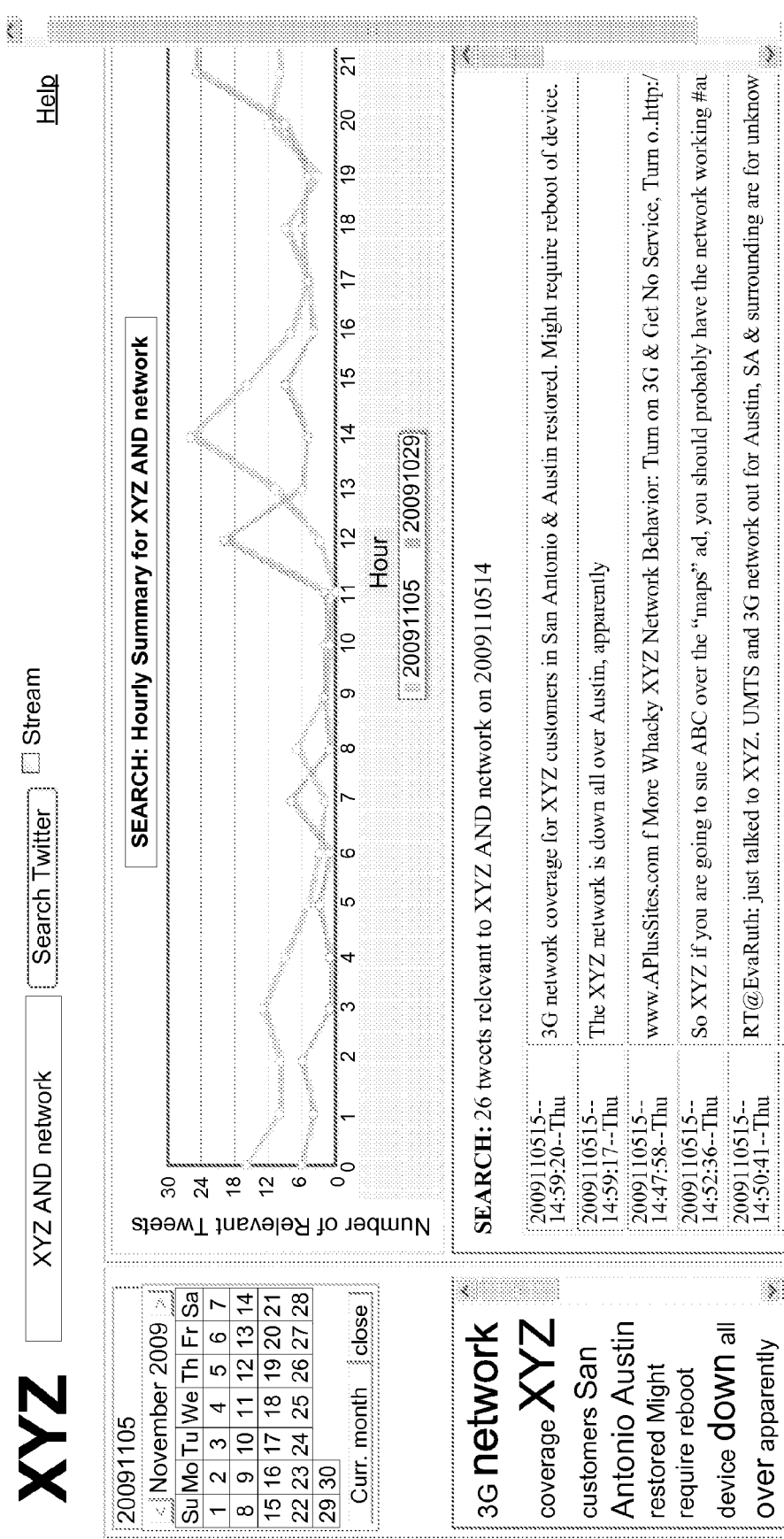
FIG. 6 illustrates an interface that consolidates interfaces shown in FIG. 3-5 relating to a topic "XYZ."

FIG. 3 illustrates an interface that displays a simple count of social media posts (e.g. tweets on Twitter) relating to a topic "XYZ." The line relating to 20091203 reflects data for the current date, the data reflecting zero counts for times after the current time (15:00). The line relating to 20091126 displays counts for the previous week. FIG. 4 illustrates an interface that displays a cloud of the most common phrases associated with the topic "XYZ" in the past hour. Such a cloud could enable a user to view the most common topics associated with "XYZ." In one embodiment, a user clicks on a phrase to launch an interface, such as that shown in FIG. 3, where the system queries on the phrase "XYZ" and the selected phrase. FIG. 5 illustrates an interface that displays a real-time stream of the most recent social media posts relating to the topic "XYZ." In one embodiment, a user clicks on a phrase to launch an interface, such as that shown in FIG. 3, where the system queries on the phrase "XYZ" and key words extracted from the selected phrase. FIG. 6 illustrates an interface that consolidates interfaces shown in FIG. 3-5 relating to a topic "XYZ." In one embodiment, a user clicks on a phrase to launch an interface, such as that shown in FIG. 3, where the system queries on the phrase "XYZ" and the selected phrase.

Other interfaces are possible. For example, the interface could display user sentiment relating to a topic in a format similar to an election map. The map could, for example, reflect a map of the United States reflecting sentiment by state. States reflecting predominantly negative sentiments could be colored red, states reflecting predominantly positive sentiments could be colored green and states reflecting predominantly neutral sentiments could be colored white. Alternatively, the interface could express various sentiments as patterns, such as shading and cross-hatching.

Figure 7:
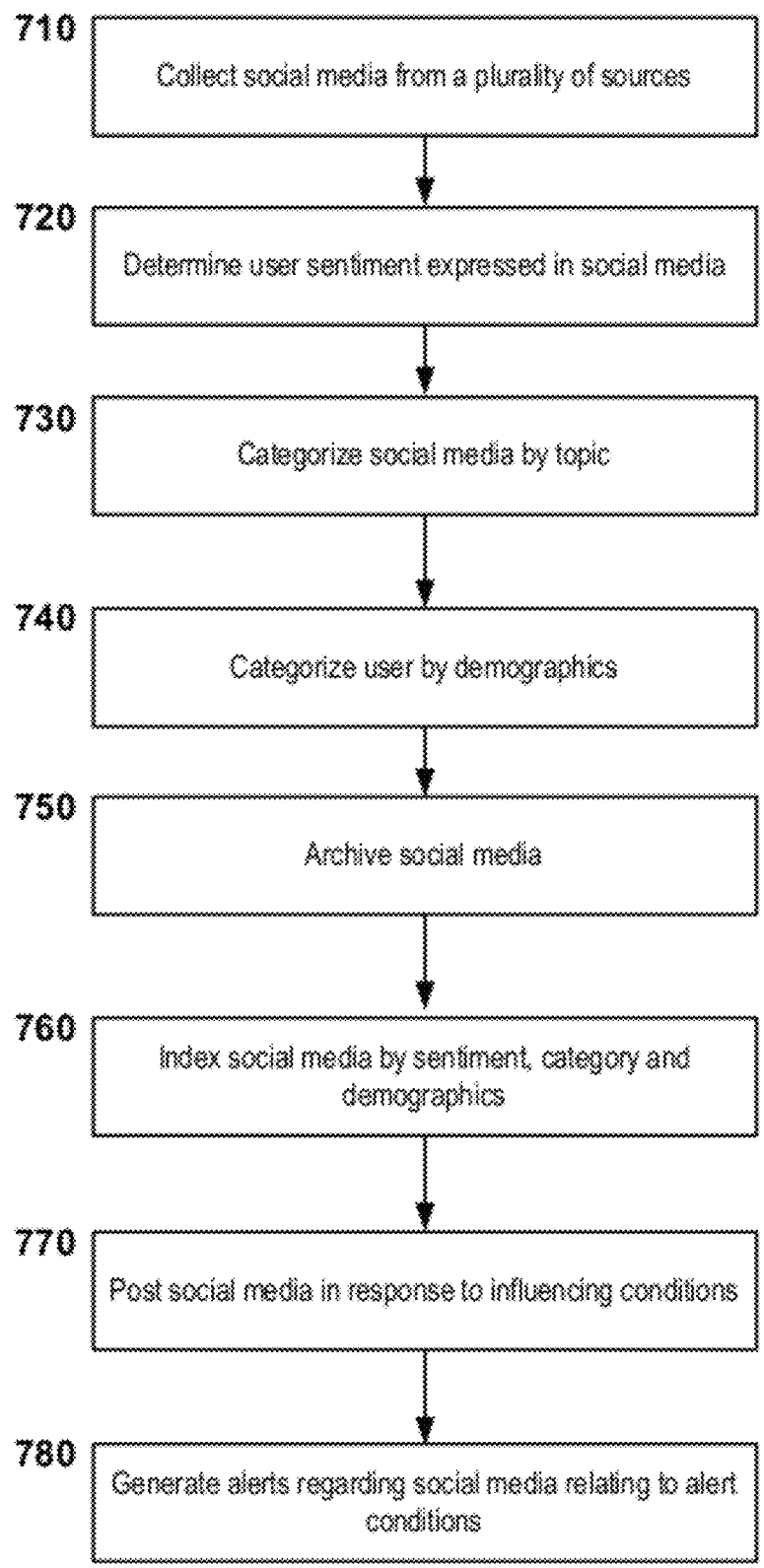
FIG. 7 illustrates a method for aggregating and reporting social media.

FIG. 7 illustrates a method 700 for aggregating and reporting social media. In block 710, a process running on a server collects social media from a plurality of sources. Such sources could include social networking sites, such as Facebook or LinkedIn, or microblogging sites such as Twitter. The process could filter the collected social media by keyword or user ID to reduce the volume of such social media. For example, the process could filter tweets based on a specific company such as "XYZ" and/or "ABC," since a specific company may only be interested in social media posts that relate to that company. In another example, social media could be filtered by topic, for example "network," "response time" or "DSL." In one embodiment, a data collection module (such as element 202 of FIG. 2) hosted on a social media analysis server 200 performs the processing described with respect to block 710. In one embodiment, the processing of block 710 includes parsing the social media to extract entities such as urls, locations, person names, topic tags, user ID, products, and features of products. In one embodiment, the processing of block 710 includes estimating the location from which users submitted social media when the location is not expressly given in the social media.

In block 720, a process running on a server analyzes the social media to determine the user's sentiment, mood or purpose in posting the social media. In one embodiment, the process detects user sentiment in social media by recognizing positive words, such as "awesome," "rock," "love" and "beat" and negative words such as "hate," "stupid" and "fail." The correlation between a sentiment and key word could vary by source. In one embodiment, the process collects and archives only social media posts that express an opinion. In one embodiment, the process collects and archives posts expressing an opinion only if a fixed number, for example three, of posts express the same opinion. In one embodiment, a sentiment analysis module (such as element 205 of FIG. 2) hosted on a social media analysis server 200 performs the processing described with respect to block 720.

In block 730, a process running on a server analyzes the social media to categorize the media by one or more topics. Such topics could include brand (e.g. "Honda" or "Coca Cola") product type ("car," or "SUV"), or product quality ("good," "bad" or "unreliable"). Such topics could be predefined, or the process could determine topics dynamically by consolidating social media posts from multiple users. In one embodiment, the process could use such topics to cluster social media posts as shown in FIG. 4. In one embodiment, the process could assign specific topics a priority or importance. For example, the process could assign a topic such as "network outage" a higher priority than "slow response." In one embodiment, a social data categorization module (such as element 210 of FIG. 2) hosted on a social media analysis server 200 performs the processing described with respect to block 730.

In block 740, a process running on a server analyzes the user posting the social media to categorize users associated with each post by one or more demographic categories. Such categories could include age, income level and interests (e.g. classical music or cross country skiing). Such categories could include user location (e.g. city, state or region). The process could determine such information from user profile data or from the content of social media posts. The process could determine such information by mining a user's social network (e.g. the user's friends on Facebook, etc.) In one embodiment, a user categorization module (such as element 215 of FIG. 2) hosted on a social media analysis server 200 performs the processing described with respect to block 740. In one embodiment, the processing of block 740 additionally includes determining the influence of individual users within their demographic group.

In block 750, a process running on a server archives the social media to a computer readable medium. The process could store the social media on any type of database known in the art, such as, for example, a relational database. The database could include all, or a subset of the data collected in the operation described above with respect to block 710. For example, the process could only archive data relating to specific entities (e.g. "XYZ") and/or topics ("network" or "customer service"). In one embodiment, a data archiving module (such as element 220 of FIG. 2) hosted on a social media analysis server 200 performs the processing described with respect to block 750.

In one embodiment, in addition to archiving social media with high precision and recall, the system archives user profiles and the social connections of the users associated with the social media along with the social media. In one embodiment, the processing of block 740 collects all such information. Additionally or alternatively, the processing of block 750 includes retrieving the user profiles and social connections of users relating to the archived social media.

In block 760, a process running on a server indexes the archived social media by one or more properties. The process indexes the data to allow for efficient retrieval of social media by its properties. Such properties could include, for example, key words, user sentiments, or user demographics. In one embodiment, a data indexing module (such as element 230 of FIG. 2) hosted on a social media analysis server 200 performs the processing described with respect to block 760.

In block 770, a process running on a server posts data to social media websites to influence users of the social media websites. In one embodiment, the processing of block 770 includes determining to what extent archived social media is crucial to targeted businesses, measuring the influence of relevant posts within the archived social media and predicting the influence of newly archived social media. In one embodiment, where the processing determines that newly archived social media indicates an opportunity to influence users, the system can post new media to social media sites to attempt to influence users.

The process could influence users in a number of ways. The process could influence users by including posts to improve the perception of a company's customer service. For example, if a user posts a tweet reporting slow response time on a network, the process could post a tweet that indicates that the network provider is aware of the problem and is working on it. The process could influence users by including posts to increase demand for a company's services. For example, if a user posts a tweet reporting poor customer service by a competitor, the process could post a tweet suggesting the user try the company's service offerings. In one embodiment, an influencing module (such as element 235 of FIG. 2) hosted on a social media analysis server 200 performs the processing described with respect to block 770.

In block 780, a process running on a server analyzes archived social media to determine if alert conditions have occurred. For example, where a user posts a tweet reporting slow response time on a network, the process could send an operations center an alert (e.g. an email or a text message) indicating that an alert condition has occurred (e.g. slow network response time). Any type of condition, such as a customer complaint, could trigger an alert to a business unit within a company that is best suited to respond to the alert. In one embodiment, a trending and alert module (such as element 245 of FIG. 2) hosted on a social media analysis server 200 performs the processing described with respect to block 780. In one embodiment, the processing in block 780 monitors trends of the archived posts and categorized topics and issues alerts when suspicious indicators appear based on statistical models or patterns.

Figure 8:
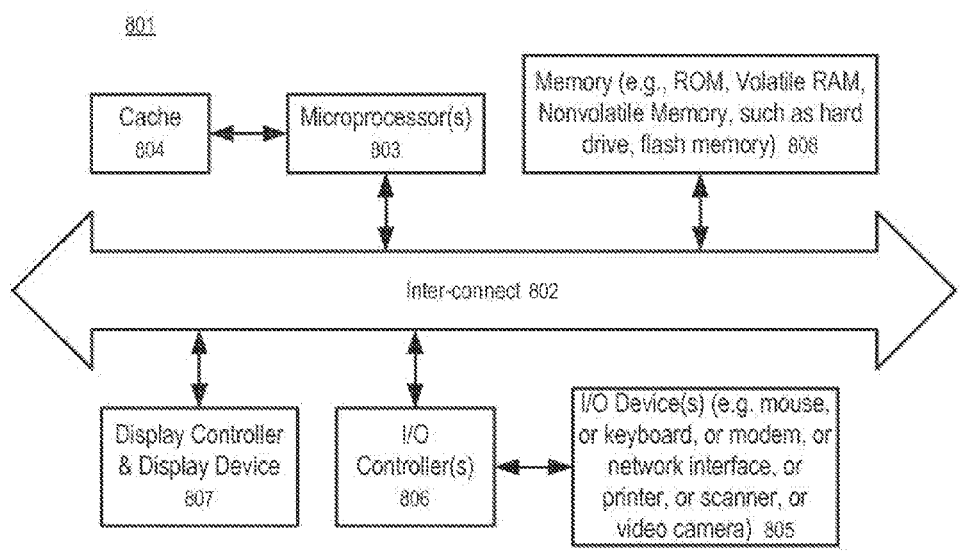
FIG. 8 shows a block diagram of a data processing system which can be used in various embodiments of the disclosed system and method.

FIG. 8 shows a block diagram of a data processing system 801 which can be used in various embodiments of the disclosed system and method. While FIG. 8 illustrates various components of a computer system, it is not intended to represent any particular architecture or manner of interconnecting the components. Other systems that have fewer or more components may also be used. In one embodiment, one or more data processing systems, such as that shown in 801 of FIG. 8, implement the social media analysis servers 200 shown in FIGS. 1 and 2. In one embodiment, a data processing system, such as that shown in 801 of FIG. 8, implements each of the modules 202-250 of the social media analysis server 200 of FIG. 2, where each of the modules comprises computer-executable instructions stored on the system's memory 808, such instructions being executed by the system's microprocessor 803. Other configurations are possible, as will be readily apparent to those skilled in the art.

In FIG. 8, the data processing system 801 includes an inter-connect 802 (e.g., bus and system core logic), which interconnects a microprocessor(s) 803 and memory 808. The microprocessor 803 is coupled to cache memory 804 in the example of FIG. 8.

The inter-connect 802 interconnects the microprocessor(s) 803 and the memory 808 together and also interconnects them to a display controller and display device 807 and to peripheral devices such as input/output (I/O) devices 805 through an input/output controller(s) 806. Typical I/O devices include mice, keyboards, modems, network interfaces, printers, scanners, video cameras and other devices which are well known in the art.

The inter-connect 802 may include one or more buses connected to one another through various bridges, controllers and/or adapters. In one embodiment the I/O controller 806 includes a USB (Universal Serial Bus) adapter for controlling USB peripherals, and/or an IEEE-1394 bus adapter for controlling IEEE-1394 peripherals.

The memory 808 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the social media analysis servers 200 are implemented using one or more data processing systems as illustrated in FIG. 8. In some embodiments, one or more servers of the system illustrated in FIG. 8 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 803 and/or the memory 808. For example, the functionalities described above can be partially implemented via hardware logic in the microprocessor(s) 803 and partially using the instructions stored in the memory 808. Some embodiments are implemented using the microprocessor(s) 803 without additional instructions stored in the memory 808. Some embodiments are implemented using the instructions stored in the memory 808 for execution by one or more general purpose microprocessor(s) 803. Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    collecting, using a computing device comprising a processor that executes a sentiment analysis module, a social media post that relates to a topic, the topic comprising a brand and a product type, wherein the social media post is created by a user and collected from a social media website;

analyzing, using the processor, a sentiment expressed in the social media post, the sentiment comprising an opinion of the user, the opinion relating to the topic;

determining, using the processor, a demographic category of the user, the demographic category comprising a user location of the user, an income level of the user, and an age of the user;

archiving, using the processor, the social media post to a database stored on a storage device;

indexing, using the processor, the social media post, wherein the indexing is based upon the sentiment, the topic, and the demographic category;

generating, using the processor, a user interface that comprises a first interface, a second interface, and a third interface, wherein the first interface displays a real-time stream of a plurality of social media posts that relate to the topic, the plurality of social media posts comprising the social media post, the second interface displays most common phrases extracted from the topic during a time period, and the third interface displays a graphical representation of a count, for the time period, of the plurality of social media posts that relate to the topic in the real-time stream as updated in real-time; and providing, using the processor, the user interface to a social media analysis consumer.

2. The method of claim 1, further comprising:

determining, using the processor, that an alert condition exists based upon an analysis of the plurality of social media posts, wherein each of the plurality of social media posts relates to the topic and comprises a negative sentiment relating to the topic, and wherein the alert condition is identified by an alert module based upon a condition identified in the plurality of social media posts; and in response to determining that the alert condition exists, transmitting, using the processor, an alert that indicates that the alert condition exists.

3. The method of claim 1, further comprising:

determining, using the processor, that an influencing condition exists based upon an analysis of the plurality of social media posts, wherein each of the plurality of social media posts relates to the topic and comprises a negative sentiment relating to the topic; and in response to determining that the influencing condition exists, posting, using the processor, social media to the social media website, wherein the social media is directed to the topic and is responsive to the plurality of social media posts.

4. The method of claim 1, wherein the plurality of social media posts are collected with user profiles and social connections of users associated with the plurality of social media posts, and wherein respective profiles and social connections are archived social media posts to which they relate.

5. The method of claim 3, wherein the influencing condition is a negative comment relating to a company product, and wherein the social media comprises a further social media post that indicates that a company associated with the company product is taking an action to remedy a condition expressed in the negative comment.

6. The method of claim 3, wherein determining that the influencing condition exists comprises:

measuring, using the processor, an influence of a second plurality of social media posts archived to the database; and predicting, using the processor, the influence of each of the plurality of social media posts using the influence of the second plurality of social media posts.

7. A non-transitory machine readable medium storing instructions that cause the processor to perform operations comprising collecting a social media post that relates to a topic, the topic comprising a brand and a product type, wherein the social media post is created by a user and collected from a social media website;

analyzing a sentiment expressed in the social media post, the sentiment comprising an opinion of the user, the opinion relating to the topic;

determining, for the social media post, a demographic category of the user, the demographic category comprising a user location of the user, an income level of the user, and an age of the user;

archiving the social media post to a database stored on a storage device;

indexing the social media post, wherein the indexing is based upon the sentiment, the topic, and the demographic category;

generating a user interface that comprises a first interface, a second interface, and a third interface, wherein the first interface displays a real-time stream of a plurality of social media posts that relate to the topic, the plurality of social media posts comprising the social media post, the second interface displays most common phrases extracted from the topic during a time period, and the third interface displays a graphical representation of a count, for the time period, of the plurality of social media posts that relate to the topic in the real-time stream as updated in real-time; and providing the user interface to a social media analysis consumer.

8. The non-transitory machine readable medium of claim 7, further comprising instructions that, when executed by the processor, cause the processor to perform operations further comprising:

determining that an alert condition exists based upon an analysis of the plurality of social media posts, wherein each of the plurality of social media posts relates to the topic and comprises a negative sentiment relating to the topic, and wherein the alert condition is identified by an alert module based upon a condition identified in the plurality of social media posts; and in response to determining that the alert condition exists, transmitting an alert that indicates that the alert condition exists.

9. The non-transitory machine readable medium of claim 7, further comprising instructions that, when executed by the processor, cause the processor to perform operations further comprising:

determining that an influencing condition exists based upon an analysis of the plurality of social media posts, wherein each of the plurality of social media posts relates to the topic and comprises a negative sentiment relating to the topic; and in response to determining that the influencing condition exists, posting social media to the social media website, wherein the social media is directed to the topic and is responsive to the plurality of social media posts.

10. A system comprising:

a processor; and a memory that stores computer executable instructions that causes the processor to execute operations comprising collecting a social media post that relates to a topic, the topic comprising a brand and a product type, wherein the social media post is created by a user and collected from a social media website, analyzing a sentiment expressed in the social media post, the sentiment comprising an opinion of the user, the opinion relating to the topic, determining, for the social media post, a demographic category of the user, the demographic category comprising a user location of the user, archiving the social media post to a database stored on a storage device, indexing the social media post a, wherein the indexing is based upon the sentiment, the topic, and the demographic category, generating a user interface that comprises a first interface, a second interface, and a third interface, wherein
the first interface displays a real-time stream of a plurality of social media posts that relate to the topic, the plurality of social media posts comprising the social media post,
the second interface displays most common phrases extracted from the topic during a time period, and
the third interface displays a graphical representation of a count, for the time period, of the plurality of social media posts that relate to the topic in the real-time stream as updated in real-time; and providing the user interface to a social media analysis consumer.

11. The system of claim 10, wherein the computer executable instructions, when executed by the processor, cause the processor to execute operations further comprising:

determining that an alert condition exists based upon an analysis of the plurality of social media posts, wherein each of the plurality of social media posts relates to the topic and comprises a negative sentiment relating to the topic, and wherein the alert condition is identified by an alert module based upon a condition identified in the plurality of social media posts; and in response to determining that the alert condition exists, transmitting an alert that indicates that the alert condition exists.

12. The system of claim 10, wherein the computer executable instructions, when executed by the processor, cause the processor to execute operations further comprising:

determining that an influencing condition exists based upon an analysis of the plurality of social media posts, wherein each of the plurality of social media posts relates to the topic and comprises a negative sentiment relating to the topic; and in response to determining that the influencing condition exists, posting social media to the social media website, wherein the social media is directed to the topic and is responsive to the plurality of social media posts.

13. The method of claim 1, wherein a company associated with the brand comprises a network provider, and wherein the product type comprises network access.

14. The method of claim 1, wherein the user location is estimated based upon a user profile associated with the user.

15. The method of claim 1, wherein the user location is determined from a content of the social media post.

16. The method of claim 1, wherein the second interface comprises a phrase, and wherein a click on the phrase by a further user causes the computing device to execute a query against the database to obtain a further plurality of social media posts that relate to the phrase.

17. The method of claim 1, wherein the second interface comprises a phrase, and wherein a click on the phrase by a further user causes the computing device to launch a fourth interface that presents results from a query executed against the database to obtain a further plurality of social media posts that relate to the phrase.

* * * * *